Jan. 28, 1958     D. I. BOHN     2,821,586
MOTOR OPERATED CIRCUIT BREAKER AND DISCONNECT SWITCH
Filed March 7, 1956     3 Sheets-Sheet 1
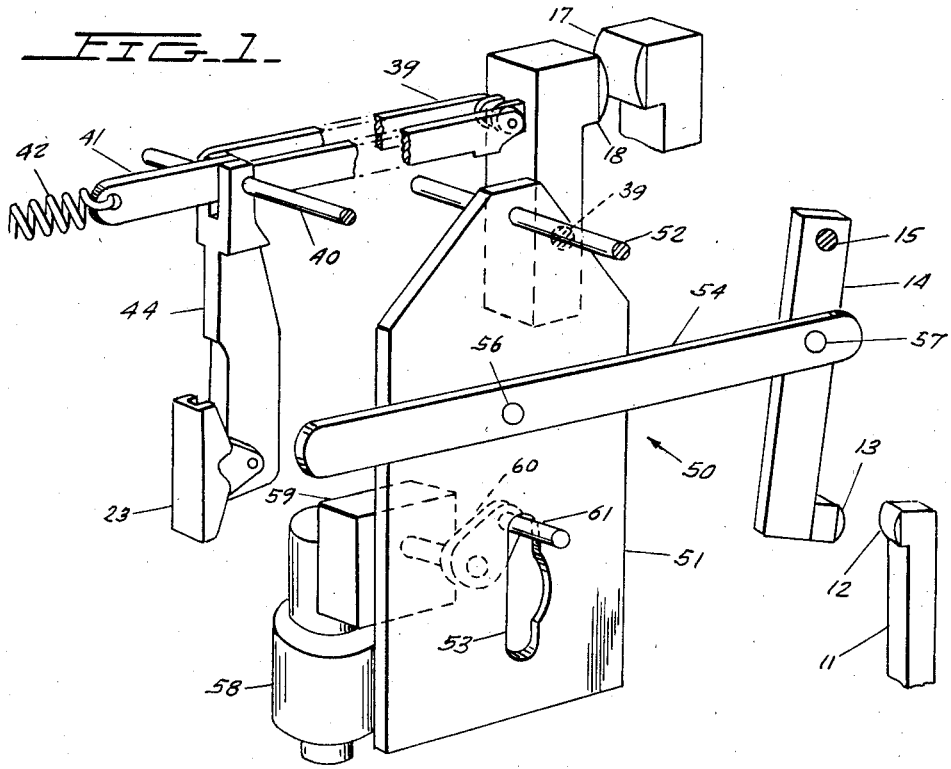
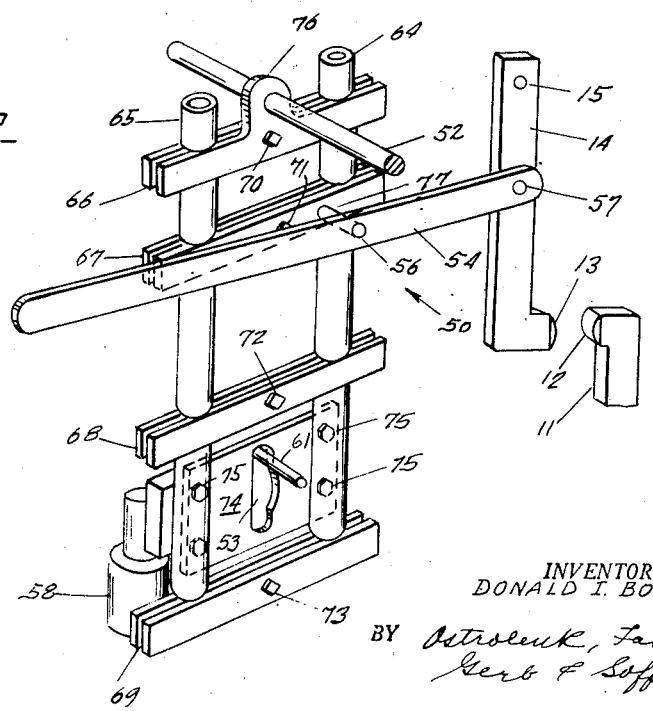
INVENTOR.
DONALD I. BOHN
BY Ostrolenk, Faber,
Gerb & Soffen
ATTORNEYS Jan. 28, 1958  D. I. BOHN  2,821,586
MOTOR OPERATED CIRCUIT BREAKER AND DISCONNECT SWITCH
Filed March 7, 1956  3 Sheets-Sheet 2
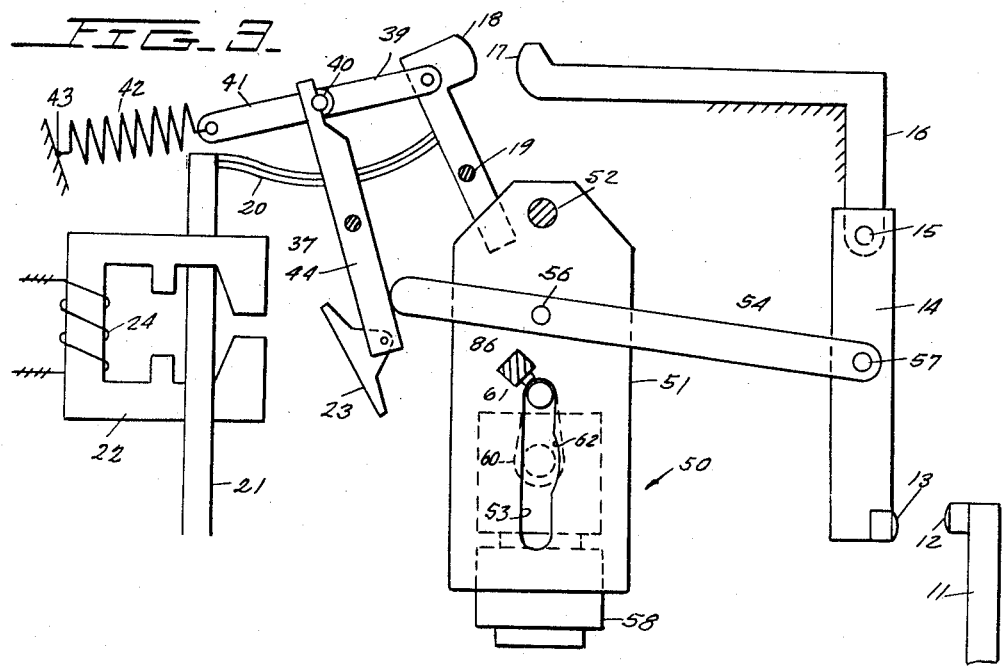
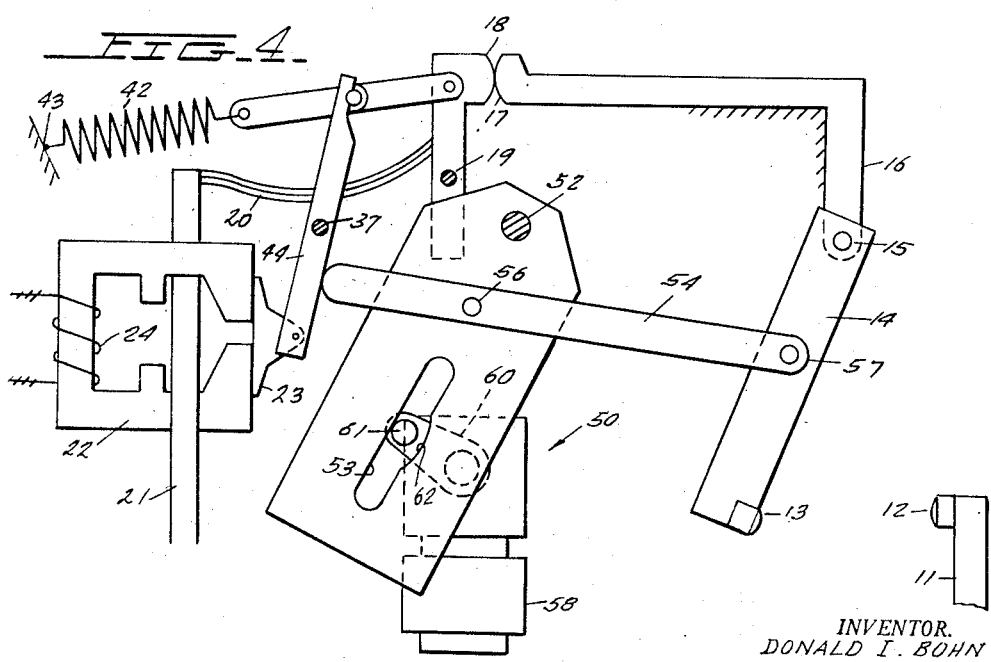
INVENTOR.
DONALD I. BOHN
BY Ostrolenk, Faber,
Gerb & Soffen
ATTORNEYS Jan. 28, 1958   D. I. BOHN   2,821,586
MOTOR OPERATED CIRCUIT BREAKER AND DISCONNECT SWITCH
Filed March 7, 1956   3 Sheets-Sheet 3
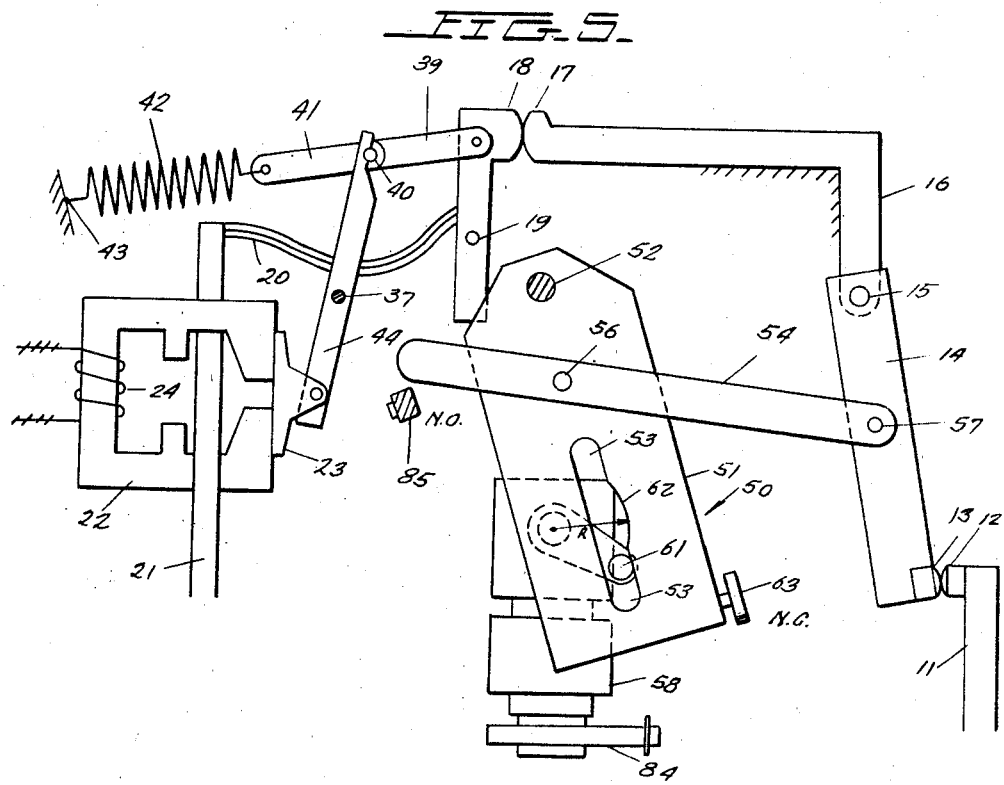
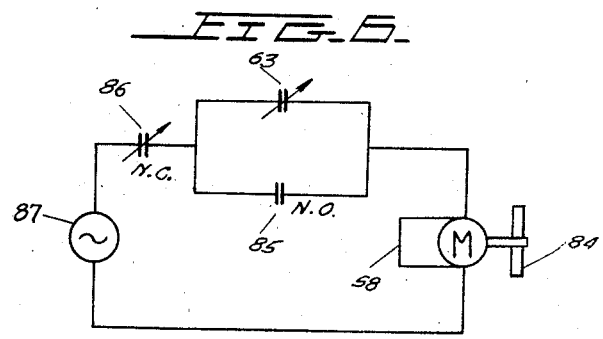
INVENTOR.
DONALD I. BOHN
BY *Ostrolenk, Faber,*
*Gerb & Soffen*
ATTORNEYS

United States Patent Office 2,821,586
Patented Jan. 28, 1958

2,821,586

MOTOR OPERATED CIRCUIT BREAKER AND DISCONNECT SWITCH

Donald I. Bohn, Asheville, N. C., assignor to I-T-E Circuit Breaker Company, Philadelphia, Pa., a corporation of Pennsylvania Application March 7, 1956, Serial No. 570,013

9 Claims. (Cl. 200—50)

My invention relates to a single operating means to operate a series connection of a circuit breaker and a disconnect switch, and more specifically, to a motor operated mechanism to operate a load interrupting device which exhibits trip free operation and comprises the series connection of a disconnect switch and a circuit breaker which does not have trip free characteristics.

Interrupting devices of this type have been shown in copending application Serial No. 507,059, filed May 9, 1955, in which the operating mechanism comprised a single solenoid which is sequentially connected to the circuit breaker and disconnect. This system however requires a complicated linkage which I now replace with a simple motor operated mechanism.

The motor operated mechanism of my invention is first connected to the circuit breaker to engage the contacts thereof, and is then disconnected from the circuit breaker and connected to engage the disconnect switch contacts. Since the operating mechanism is now disconnected from the circuit breaker, trip free operation will result if the disconnect switch is closed on a circuit fault.

Therefore, by providing the above series connection wherein the circuit breaker is used to interrupt the line which is being protected and the disconnect switch is used to initiate circuit energization after the circuit breaker contacts have engaged, trip free results will be preserved since the circuit breaker contacts will immediately disengage if the disconnect switch is closed under fault conditions in the circuit.

This system can be specifically applied to high speed circuit interrupting devices wherein maintenance is decreased with the elimination of a complicated trip free mechanism. As well as decreasing maintenance, this type system also increases realiability of the system interrupting device.

By now providing this combination with my novel motor operated mechanism for operation of both the circuit breaker and disconnect switch, I provide further economy and saving of space without sacrificing efficiency of operation of the combination.

The novel single operating means of my invention will, as is shown hereinafter, perform two functions: the first function is to close the non-trip free circuit breaker contact and its second function is to close the disconnect switch to thereby complete energization of the circuit being protected. With the system of my invention, these operations must occur in the proper sequence and the disconnect switch is prevented from being opened until the circuit breaker contacts have disengaged.

Although the embodiment shown hereinafter in the description of my invention is a high speed anode breaker utilizing a magnetic latch of the type described in U. S. Patent 2,412,247, assigned to the assignee of the instant application, it will be apparent that my system can be applied to any circuit interrupting device having a circuit breaker which can have non-trip free characteristics with a disconnect switch.

Accordingly, a main object of my invention is to provide a means to operate both a non-trip free circuit breaker and series connected disconnect switch and allow trip free operation to result by disconnecting the operating means from the circuit breaker before the disconnect switch is closed to complete a circuit.

Another object of my invention is to energize the contacts of a series connection of a circuit breaker and disconnect switch from a motor operated mechanism.

Still another object of my invention is to provide an operating mechanism to energize the operation of a combination of a disconnect switch and circuit breaker having a non-trip free mechanism according to a predetermined sequence.

A further object of my invention is to provide a single motor operated means which is so constructed that it will first close the contacts of a circuit breaker and secondly close the contacts of a disconnect switch under any conditions.

Still another object of my invention is to provide an operating means which is so constructed that it will maintain disconnect switch contacts colsed until circuit breaker contacts are disengaged.

Still a further object of my invention is to provide a single energizing means and mechanism for sequentially connecting an operating mechanism to a pair of circuit breaker contacts and to a disconnect switch contact.

These and other objects of my invention will become apparent from the following description when taken in connection with the drawings in which:

Figure 1 shows an embodiment of my invention in a perspective view.

Figure 2 shows another form which could be assumed by the motor operated mechanism of Figure 1.

Figure 3 shows the embodiment of Figure 1 of my invention as applied to a series connected circuit breaker and disconnect switch wherein both the circuit breaker contacts and disconnect switch contacts are disengaged.

Figure 4 is similar to Figure 3 and shows the condition after the circuit breaker cooperating contacts are moved to the engaged position.

Figure 5 is similar to Figure 4 after the motor operated mechanism has been energized to engage the disconnect switch contacts.

Figure 6 shows a latching system which will prevent disengagement of the disconnect switch until the circuit breaker contacts disengage.

It should be noted that in each of Figures 3, 4 and 5, the means to maintain the circuit breaker cooperating contacts in the engaged position is a magnetic type latch shown in the above mentioned Patent 2,412,247 and that the interrupting device of these figures would be preferably applied to a D.-C. circuit. It will, however, be obvious that this magnetic latch can be replaced by any other type to thereby allow my system to have universal application to devices having series connected disconnect switches and circuit breaker.

Referring now to Figures 1, 3, 4, and 5, the circuit interrupting device shown therein comprises a current path which contains a first terminal 11, the fixed disconnect switch contact 12, a movable disconnect switch contact 13 which cooperates with the fixed contact 12, and the disconnect switch blade 14 which is pivoted at a fixed pivot 15. Fixed pivot 15 is also a current carrying pivot which will allow current to pass from the disconnect switch blade 14 to a current conductor 16. Current conductor 16 is then attached to a fixed contact 17 of a circuit breaker. The movable contact 18 of the circuit breaker has a fixed pivot 19 and a current carrying jumper 20. Current carrying jumper 20 is then attached to a second terminal 21 of the circuit interrupting device. The current path, therefore, comprises components 11, 12, 13, 14, 15, 16, 17, 18, 20 and 21.

The second terminal 21 is shown in Figures 3, 4 and 5 as passing through a magnetic structure 22 which cooperates with armature 23 to form a magnetic latch. Magnetic structure 22 is also shown as having an energizing winding 24 for initiating energization of the magnetic latch. That is, when the magnetic latch is energized, armature 23 will be firmly seated on the surface of the magnetic structure 22 as is shown in Figures 4 and 5.

The opening operation of the circuit breaker as shown in Figures 1, 3, 4 and 5 is affected by a counterclockwise rotation of the walking beam 44, as shown in the above mentioned figures, engages the pin 40 of the linkages 39 and 41 in such a manner as to drive the movable contact structure of the circuit breaker in a clockwise direction about its pivot point 19 against the force of its biasing spring 42 which is fixed at a fixed body 43. If desired, the operable connection between the hook shaped end of the walking beam 44 and the pin 40 could have been a directly fastened pivotal connection. When the contacts 17, 18 are in the engaged position, it is seen that the armature 23 will seal itself against the magnetic body 22 to thereby maintain a walking beam 44 in a position to maintain the contact engagement between the circuit breaker contacts 17 and 18.

The sequential engagement of the circuit breaker contact 17 and 18 and the disconnect switch contacts 12 and 13 is initiated through the novel arrangement which comprises the motor operated linkage shown generally at 50. This linkage, as is shown in each of Figures 1, 3, 4 and 5, comprises a beam 51 which is pivotally connected to a fixed pin 52 and carries an aperture 53 therein. A second link or beam 54 is shown as being pivotally connected to the beam 51 at the pivot point 56. The link 54 is, as shown in Figure 1, so positioned that a clockwise rotation of the beam 51 about its pivot point 52 will bring the left hand end of the link 54 into engagement with the walking beam 44 to effect a subsequent contact engagement of circuit breaker contacts 17 and 18. Similarly, a counterclockwise rotation of the beam 51 about its pivot point 52 will, in view of the pivotal connection between the link 54 and the disconnect switch blade 14 at pivot 57, drive the disconnect cooperating contacts 12 and 13 into their engaged position.

This linkage is operated by means of the motor 58 and its associated gear box 59 which has a protruding shaft and crankarm 60. The shaft and crankarm 60 has a pin 61 attached thereto, this pin or cam roller being positioned to rotate within the aperture 53 of the beam 51. It is, therefore, clear that rotation of the shaft and crankarm 60 will cause pin 61 to drive the beam 51 in an oscillatory type of motion. As will be shown hereinafter, this novel construction to which my invention is directed will allow a sequential engagement of the circuit breaker contact 17 and 18 and the disconnect contact 12 and 13.

Referring now to Figure 3, it is seen that both the circuit breaker contact 17 and 18 and the disconnect contact 12 and 13 are in their disengaged position. Similarly, the motor 58 has rotated the pin 61 to an upright position within the aperture 53 of the beam 51.

It is now desired to begin the sequential operation to close the circuit interrupting device. The first step of this sequential operation is seen in going from Figure 3 to Figure 4. When motor 58 is energized, the pin 61 is rotated in a counterclockwise direction to the position of Figure 4. The engagement between the pin 61 and the aperture 53 is such that the beam 51 will be pivoted about the pivot point 52 to assume the position shown in Figure 4. Clearly, since the link 54 is pivotally mounted on the beam 51 at the pivot point 56, the left hand end of beam 54 comes into engagement with the walking beam 44 during this clockwise rotation of the beam 51 and causes rotation of walking beam 44 about its pivot point 37 in a clockwise direction to move the movable contact 18 of the circuit breaker into engagement with its fixed contact 17.

When the beam 54 has moved the walking beam 44 to the position shown in Figure 4, it is seen that the armature 23 which is physically attached at the bottom of the walking beam 44 seals against the magnetic structure 22 to hold the contacts in their engaged position even though the link 54 will be removed from its operable connection with the walking beam 44. Hence, the first step of the sequential closing has been achieved and the circuit interrupting device is in the condition shown in Fgure 4.

It is now desired to close the disconnect switch to finally energize the circuit which is being protected by this circuit interrupting device. That is to say, it is desired now to go from the position of Figure 4 to the position of Figure 5.

This is achieved by continuing the energization of the motor 58 and continuing the rotation of the pin 61 within the aperture 53. Since the beam 51 in the position of Figure 4 is at the maximum point of its clockwise travel, continued rotation of pin 61 will result in counterclockwise rotation of the beam 51 about its pivot point 52. During this counter-clockwise rotation, it is seen that the beam or link 54 is removed from the walking beam 44, this being held in its closed position by the magnetic seal between the magnetic body 22 and the armature 23 and the blade 14, in view of the connection between the link 54 and the blade 14 at the pivot point 57 will rotate about its pivot point 15 in a counterclockwise direction until, as shown in Figure 5, the disconnect contact 13 comes into engagement with contact 12 and the pin 61 is in the position shown in Figure 5. It is now seen that the cut out 62 which is an arc of radius R whose center, when in the position of Figure 5, coincides with the crankshaft pivot center allows for overtravel or continued rotation of pin 61 without causing motion of the blade 14.

It is to be noted at this time that in the series connection of the circuit breaker and the disconnect switch that it is not necessary that the circuit breaker have trip free mechanism since the disconnect contacts are the last to engage. That is to say, if the disconnect contacts 12, 13 engage on a fault, the circuit breaker will be opened by its fault sensing mechanism. This is the one major advantage in the utilization of this type of circuit interrupting device. That is, it is not necessary for the circuit breaker to have trip free features, thereby eliminating additional mechanism which may slow up the operation of the circuit breaker. As well as allowing a faster circuit interruption with the abandonment of trip free mechanism, the circuit breaker is further made more reliable and easier to maintain.

Referring now to the disconnect contacts, it may be desirable to allow flexible contact engagement between the contacts 12 and 13 whereby continued rotation of the pin 61 of Figure 5 will merely drive the contacts 12 and 13 of the disconnect switch into a more intimate contact engagement.

The aperture 53 of the beam 51 is provided with an inset or cutout 62 which is so positioned that when the circuit interrupting device is in the position of Figure 5, a continued rotation of the pin 61 after reaching this cutout 62 will not affect the movement of any of the components of the mechanism. This will allow a period of play in which the rotation of the motor may be de-energized to prevent a reopening of the disconnect switch contacts 12, 13. This condition may be further protected against by providing a normally closed switch 63 which is so positioned and so connected with the energizing circuit of the motor 58 that when the beam 51 assumes its maximum right hand position, it will engage the switch 63 to cause automatic de-energization of the motor.

When the circuit breaker and disconnect contacts are in the position shown in Figure 5 and the circuit they are protecting is to be opened, it is clearly understood that it is the circuit breaker contacts 17 and 18 which are operated to their disengaged position. Hence, upon the occurrence of a fault, the armature 23 of Figure 5 will be released and the spring 42 will operate the circuit breaker contact 18 to its disengaged position. Subsequent to the opening by the circuit breaker, the pin 61 is then rotated in its counterclockwise direction to open the disconnect contacts 12 and 13 to thereby place the mechanism in the position shown in Figure 3.

In summary, it is seen that when the circuit interrupting device shown in these figures is used for current interruption, it is the circuit breaker contacts 17, 18 which may be provided with extinguishing means which are normally used in conjunction with circuit breakers that are responsible for the current interruption. Conversely, it is the disconnect switch contacts 12 and 13 that are responsible for completing the circuit only after the circuit breaker cooperating contacts 17 and 18 have engaged.

Clearly, if the disconnect switch contacts 12 and 13 are engaged while fault conditions exist on the protected line, the fault sensing element of the circuit breaker will be activated to disengage the circuit breaker cooperating contacts 18 and 17. This action then precludes the use of a trip free linkage in the circuit breaker since trip free results are achieved as shown above.

An alternative construction of the novel motor operated linkage of my invention is shown in Figure 2. In this figure, the beam 51 instead of being a solid plate having an aperture 53 cut therein is replaced by a system of pipes and clamps with a small plate containing the necessary aperture fastened to this assembly.

Hence, it is seen that the pipes 64 and 65 are fastened together by means of the clamps 66, 67, 68 and 69 which are, in turn, fastened by the bolts 70, 71, 72 and 73, respectively. A small plate 74 is then provided with the essential aperture 53 for receiving a pin 61 and is fastened to this structure by means of the bolts 75. The clamp 66 is provided with an extension 76 which is pivotally mounted on the fixed pivot point 52. Similarly, the clamps 67 are provided with an extending pin 77 which pivotally mounts the link 54.

Clearly, the operation of the mechanism shown in Figure 2 is identical to the mechanism described in conjunction with Figures 1, 3, 4 and 5. However, it is possible that the structure shown in Figure 2 would be more economical to manufacture.

In order to assure that the disconnect contacts 12, 13 cannot be opened until circuit breaker contacts 17, 18 are opened, the electrical interlock circuit shown in Figures 5 and 6 could be used.

In these figures an interlocking system is shown in which a spring loaded brake 84 and two additional limit switches 85 and 86 are utilized. The spring loaded brake 84 which is applied to a brake drum on the shaft of motor 58 is of the type that will be released magnetically. Normally open switch 85 is positioned to be closed when beam 44 is in the position of contact disengagement and normally closed switch 86 is positioned to be opened when the motor crank rotates to the vertical position as shown in Figure 3.

Figure 6 now specifically shows how the motor 58 is energized from a power source 87 in conjunction with the interlock system.

In operation, as beam 5 of Figure 6 rotates to close the disconnect contacts, the normally closed switch 63 is opened just as the roller or pin 61 enters the arc 62. The motor is then deenergized and the brake 84 applied to stop its rotation.

When the circuit breaker contacts open for any reason, the normally open switch 85 energizes the motor 58 and at the same time releases the brake 84 and opens the disconnect contacts 12, 13. When the motor crank finally achieves the position of Figure 3, normally closed switch 86 deenergizes the motor to hold both main and disconnect contacts in the open position.

Although I have shown preferred embodiments of my invention, it will now be obvious that many modifications and variations may be made by those skilled in the art. I prefer to be limited, therefore, not by the specific description given herein but only by the appended claims.

I claim:

1. In a circuit interrupting device comprising a circuit breaker and a disconnect switch; said circuit breaker having cooperating contacts and means to automatically disengage said cooperating contacts in response to predetermined conditions in the circuit protected by said circuit interrupting device; said disconnect switch comprising cooperating contacts; said disconnect switch cooperating contacts connected in series with said circuit breaker cooperating contacts; a single motor operated means operatively connected to said circuit breaker and to said disconnect switch for operating said circuit breaker cooperating contacts into engagement and subsequently said disconnect switch main contacts into engagement and interlock mechanism to maintain said disconnect switch cooperating contacts engaged when said circuit breaker contacts are engaged.

2. In combination, a circuit breaker having cooperable contacts, latching means for maintaining said contacts in engagement, fault responsive means for effecting disengagement of said contacts, disconnect contacts connectible in series with said circuit breaker contacts, a motor operated mechanism common to said circuit breaker contacts and said disconnect contacts for operating said circuit breaker and disconnect contacts to their contact engaged and disengaged position; said motor operated mechanism being constructed to operate said disconnect contacts to their engaged position only after said circuit breaker contacts have been previously operated to their engaged position.

3. In combination, a circuit breaker having cooperable contacts, latching means for maintaining said contacts in engagement, fault responsive means for effecting disengagement of said contacts, disconnect contacts connectible in series with said circuit breaker contacts, a motor operated mechanism common to said circuit breaker contacts and said disconnect contacts for operating said circuit breaker and disconnect contacts to their contact engaged and disengaged position; said motor operated mechanism being constructed to operate said disconnect contacts to their engaged position only after said circuit breaker contacts have been previously operated to their engaged position and said mechanism has been disassociated from operating said circuit breaker contacts.

4. In combination, a circuit breaker having a pair of cooperable contacts, a disconnect switch having a pair of cooperable contacts, a common motor operated mechanism for operating said circuit breaker and disconnect contacts, said mechanism being constructed to be sequentially connected to said circuit breaker contacts and thereafter to said disconnect contacts for operation of their respective engaged position.

5. In combination, a circuit breaker having a pair of cooperable contacts, a disconnect switch having a pair of cooperable contacts, a common motor operated mechanism for operating said circuit breaker and disconnect contacts, said mechanism being constructed to prevent said operating mechanism from operating said disconnect contacts to the disengaged position while said circuit breaker contacts are engaged.

6. In a circuit interrupting device comprising a circuit breaker and a disconnect switch; said circuit breaker having cooperating contacts and means to automatically disengage said cooperating contacts in response to predetermined conditions in the circuit protected by said circuit interrupting device; said disconnect switch comprising cooperating contacts; said disconnect switch cooperating contacts connected in series with said circuit breaker cooperating contacts; latching mechanism to latch said circuit breaker contacts engaged when brought to their engaged position; a motor and an operating lever; said motor being operatively connected to said operating lever whereby rotaion of said motor operatively connects said operating lever to said circuit breaker contacts to operate said circuit breaker contacts to their engaged position; said operating lever thereafter being disconnected from said circuit breaker contacts and operative to move said disconnect switch contacts to their engaged position.

7. In a circuit protecting device comprising a series connection of circuit breaker cooperating contacts for circuit interruption and disconnect switch cooperating contacts for circuit initiation; a motor operated operating means constructed to engage said circuit breaker cooperating contacts upon energization of said operating means; said circuit breaker contacts being maintained in the engaged position by a magnetic latch; said operating means constructed to subsequently engage said disconnect switch cooperating contacts to intitiate energization of the circuit protected by said circuit protecting device in response to a second energization of said operating means.

8. In combination, a circuit breaker having a pair of cooperable contacts, a disconnect switch having a pair of cooperable contacts, a common motor operated mechanism for operating said circuit breaker and disconnect contacts, said mechanism being constructed to be sequentially connected to said circuit breaker contacts and thereafter to said disconnect contacts for operation of their respective engaged position; and interlock means constructed to prevent disengagement of said disconnect contacts until said circuit breaker contacts are disengaged.

9. In a circuit interrupting device comprising a circuit breaker and a disconnect switch; said circuit breaker having cooperating contacts and means to automatically disengage said cooperating contacts in response to predetermined conditions in the circuit protected by said circuit interrupting device; said disconnect switch comprising cooperating contacts; said disconnect switch cooperating contacts connected in series with said circuit breaker cooperating contacts; latching mechanism to latch said circuit breaker contacts engaged when brought to their engaged position; a motor and an operating lever; said motor being operatively connected to said operating lever whereby rotation of said motor operatively connects said operating lever to said circuit breaker contacts to operate said circuit breaker contacts to their engaged position; said operating lever thereafter being disconnected from said circuit breaker contacts and operative to move said disconnect switch contacts to their engaged position; and interlock means constructed to prevent disengagement of said disconnect contacts until said circuit breaker contacts are disengaged.

References Cited in the file of this patent

UNITED STATES PATENTS

| | | |
|---|---|---|
| 1,872,122 | Cook | Aug. 16, 1932 |
| 2,747,047 | Schleicher | May 22, 1956 |